June 24, 1969  K. W. BULLIVANT  3,451,420
LIQUID LEVEL TRANSMITTER
Filed May 1, 1967
FIG.1
FIG.2
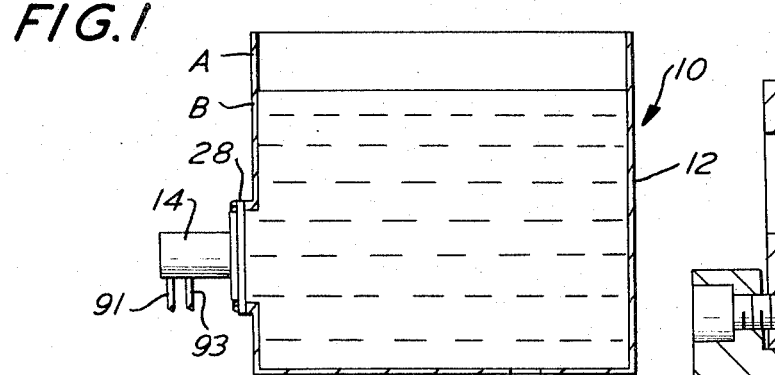
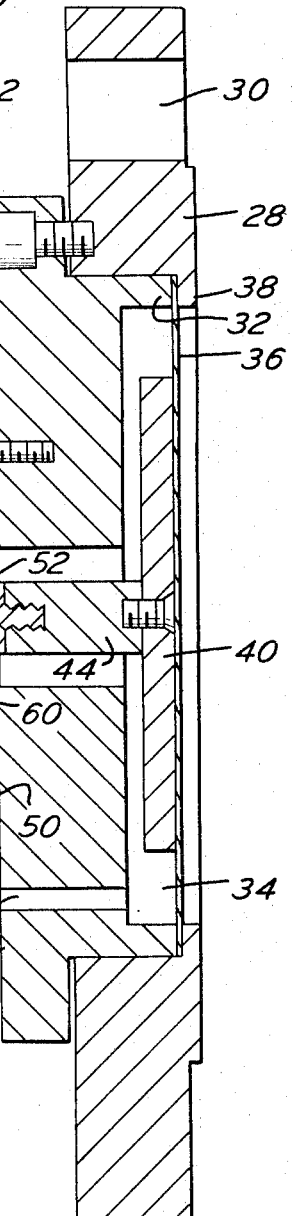
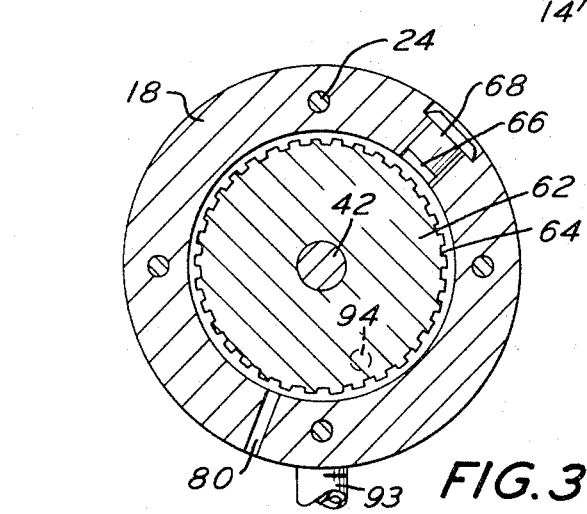
FIG.3
INVENTOR
KENNETH BULLIVANT
BY Seidel & Gonda
ATTORNEYS.

United States Patent Office 3,451,420
Patented June 24, 1969

3,451,420
LIQUID LEVEL TRANSMITTER
Kenneth Walter Bullivant, Pitman, N.J., assignor to Kane Air Scale Co., Glassboro, N.J., a corporation of New Jersey
Filed May 1, 1967, Ser. No. 635,138
Int. Cl. G01f 23/14
U.S. Cl. 137—403        9 Claims

ABSTRACT OF THE DISCLOSURE

A liquid level transmitter is provided with a means for varying the zero level elevation.

---

The apparatus of the present invention is pneumatically operable and constructed in a manner so as to transmit a signal to a valve which controls introduction of liquid into a vessel as the liquid is being removed from the vessel. The transmitter of the present invention enables the zero level to be suppressed or elevated. This is accomplished in a manner which is simple, inexpensive and reliable without using complicated feedback systems. The apparatus of the present invention may be of the direct controlling type or of the indirect controlling type.

In accordance with the present invention, the transmitter is provided with a zero level chamber within which is provided a mechanical device for elevating or suppressing the zero level. Adjustment can be accomplished merely by use of a conventional screwdriver. It is desirable to have a means for rapidly elevating or suppressing the zero level so as to vary the neutral point of the liquid head. One example wherein such a device would be desirable is when the vessel is being filled with liquids of different densities which will affect the pressure heads.

It is an object of the present invention to provide a novel liquid level transmitter having a rapidly adjustable means for changing the zero level to correspond to a conventional pneumatic control signal.

It is another object of the present invention to provide a liquid level transmitter having a mechanical device for providing elevated or suppressed zero level to correspond to a conventional pneumatic control signal.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a sectional view of a vessel having the liquid level transmitter of the present invention attached thereto.

FIGURE 2 is a vertical sectional view of the liquid level transmitter of the present invention.

FIGURE 3 is a sectional view taken along the line 3—3 in FIGURE 2.

Referring to the drawing in detail, wherein like numerals indicate like elements, there is shown a vessel 10 having an upright wall 12 and an open top. As is conventional, a conduit not shown is utilized to introduce liquids into the vessel. A control valve is provided in the conduit. The control valve may be of the direct or indirect type and is responsive to the liquid level transmitter 14 of the present invention. When the liquid level within the vessel 10 falls, the transmitter will operate the valve to permit the introduction of additional liquid into the vessel.

Referring to FIGURE 2, it will be noted that the transmitter 14 includes housing sections 16, 18, 74, 20 and 22 coupled together by a plurality of bolts 24. The bolts 24 extend into and couple housing 22 to base 26. Base 26 overlies an annular adapter 28 and is removably bolted thereto.

The adapter 28 is provided with circumferentially spaced holes 30 to facilitate coupling the adapter to a flange on the wall 12. Base 26 has an axially directed rim 32 surrounding a chamber 34 vented to atmosphere by passage 35. A diaphragm 36 has its outer peripheral portion overlying the rim 32 and clamped between the rim 32 and a radially inwardly directed flange 38 on the adapter 28. The exposed portion of diaphragm 36 is in direct contact with the liquid within vessel 10. Diaphragm 36 is constructed of material which is compatible with the liquid so as not to be corroded or otherwise affected by the same. For most liquids, the diaphragm 36 may be made from a nylon reinforced polymeric material. The central portion of the diaphragm 36 is in contact with one face of an anvil 40. The other face of anvil 40 is removably connected to a stem 42 by means of an adapter coupling 44.

A diaphragm 46 is sealingly connected to one face of housing section 20. A diaphragm 48 is sealingly connected to the inner face between each of the sections 20 and 22. Another diaphragm 50 is sealingly connected to the opposite face of housing section 22. Screws or bolts not shown are utilized to retain the diaphragms 46–50 together with the housing sections 20 and 22 in assembled relationship. A washer is provided at one end of the adapter coupling 44 so as to overlie the central portion of diaphragm 50. The diaphragms 46, 48 and 50 are maintained in spaced relationship by means of spool pieces 52 and 54, each having a radially outwardly directed flange overlying a central portion of one face of diaphragm 48. A reduced diameter portion of stem 42 extends through the spool pieces, the diaphragms 48–50, and is threadedly coupled to the adapter coupling 44.

A liquid such as a lightweight oil is provided in the chambers on opposite sides of diaphragm 50. Fill plugs 56 and 58 are provided for introducing the oil into the chambers. One of the flanges on the spool pieces such as on spool piece 54 is provided with an aperture. Said aperture is in line with a restricted orifice plug 60 on the flange of the other spool piece, namely spool piece 52. In this manner, the oil may flow between the chambers on opposite sides of diaphragm 48.

Hereinafter, the housing sections 20 and 22 together with the diaphragms 46–50 may be referred to as a sealed dampening unit. The purpose of the dampening unit is to stabilize the forces acting on diaphragm 36, and transmitted by the stem 42 from pulsations of the liquid head in the vessel 10.

The housing section 18 contains a means for selectively preloading the center stem so that the output signal corresponding to arbitrary zero level is elevated or suppressed with respect to the liquid head in vessel 10. Such means includes a ring 62 threadedly coupled to the outer periphery of stem 42. A plurality of notches 64 are provided at spaced points around the periphery of ring 62. An elongated or elliptical shaped opening 66 is provided in the body section 18. The opening is temporarily closed by a removable comparably shaped plug 68. The axial dimension of the periphery of ring 62 is greater in length than the major length of the elliptical shaped opening 66. When plug 68 is removed, a tool such as a screwdriver may be inserted through opening 66 into engagement with one of the notches 64. By application of a leverage force, the screwdriver or other tool may be utilized to rotate ring 62.

Body section 18 is provided with a radially inwardly directed flange 70 which overlies the outer peripheral portion of diaphragm 46. A body section 74 is provided between body sections 16 and 18. A spring 76 extends between body section 74 and the ring 62. A spring 78 is provided between flange 70 and the ring 62. The springs 76 and 78 are coaxial with respect to stem 42 and ring 62.

The chamber 72 within body section 18 is vented to atmosphere by way of a vent hole 80. A diaphragm 82 is provided between the body sections 16 and 74. Plates are provided on opposite sides of the diaphragm 82 and clamped between the juxtaposed surfaces of the body sections 16 and 74. An adapter having an enlarged head 84 extends through a central part of the diaphragm 82. The adapter is hollow and has one end threadedly coupled to an end face of the stem 42. The passageway axially disposed within the adapter is in line with and communicates with an L-shaped passageway in the stem 42.

The head 84 on the adapter is in contact with a valve actuator 90 and the passageway in the adapter is closed by actuator 90. The actuator 90 is part of the valve 86 threadedly coupled to the body section 18. Body section 16 is provided with a passage 87 providing communication between chambers 88 and 89. Flow from chamber 88 through passage 87 to chamber 89 is controlled by valve 86. Actuator 90 is spring biased to the right in FIGURE 2 so as to maintain the valve 86 closed. When actuator 90 moves to the left in FIGURE 2, air from conduit 91 may flow through chamber 88, passage 87, into chamber 89.

Valve 86 is commercially available and disclosed in greater detail in copending application Ser. No. 587,300 filed on Oct. 17, 1966 and entitled Liquid Level Control Apparatus. That copending application is owned by the same assignee as this application and the disclosure therein is incorporated herein by reference. Conduit 93 provides communication between chamber 89 and a valve for controlling flow of liquid into the vessel 10.

Operation of the transmitter 14 is as follows:

It will be assumed that it is desirable to maintain the liquid level in vessel 10 between points A and B. When the liquid level falls below level B, due to the outflow of liquid from the vessel, the liquid head acting on diaphragm 36 drops, allowing stem 42 and the adapter head 84 to move to the right in FIGURE 2. When head 84 no longer contacts actuator 90, the air within chamber 89 may flow through the adapter, through the passage in stem 42, into chamber 72 and then to atmosphere by way of the vent hole 80. This decrease in pressure in chamber 89 is communicated by way of conduit 93 to the valve thereby causing the valve to open and permit additional liquid to be introduced into the vessel 10.

As the level in the vessel 10 increases beyond level A, the pressure head acting on diaphragm 36 will be transmitted through the stem 42, actuator 90, to open the valve 86 so as to permit air from conduit 91 to flow through chamber 88, passage 87, chamber 89, and conduit 93 to the valve to cause the valve to close. The sealed dampening unit stabilizes the forces transmitted by the stem 42 so as to remove pulsations and prevent rapid opening and closing of valve 86. The pressure in chamber 89 can be readily ascertained by an indicating gauge positioned in passage 94 in body section 16.

The ring 62 in the position illustrated in FIGURE 2 corresponds to the neutral point whereby a force is applied to the right in FIGURE 2 by stem 42 so as to balance out the tare weight of the head of the liquid. Rotation of ring 62 in a direction so that it moves to the right in FIGURE 2 will increase the force on diaphragm 36 so as to enable one to selectively elevate the neutral point of the liquid head thereby elevating the range A–B. Rotation of the ring 62 in the opposite direction will likewise have the effect of lowering the range A–B. Rotation of ring 62 is capable of being effected by introducing a screwdriver or other tool through opening 66 into engagement with the notches 64 on the outer periphery of ring 62. Such rotation is effected by using the screwdriver or other tool as a lever with the body section 18 as the fulcrum of the lever. Thus, it will be seen that a plus or minus bias may be applied as desired and rapidly converted by use of readily available tools.

The present invention may be embodied in other specific forms without departing from the spirit or essential attributes thereof and, accordingly, reference should be made to the appended claims, rather than to the foregoing specification as indicating the scope of the invention.

I claim:

1. A liquid level transmitter comprising a housing having an exposed pressure responsive member at one end thereof, a stem in the housing connected to the member and extending in a direction away from said member, means defining a biasing chamber in the housing and associated with the stem for balancing out a portion of the liquid head, and means in said biasing chamber coupled to said stem for loading the stem to vary the starting point of the range wherein said means for loading the stem is a ring coaxial with and threadedly coupled to the stem, and means on the housing for facilitating rotation of the ring.

2. A transmitter in accordance with claim 1 including springs on opposite sides of the ring, said springs being coaxial with and surrounding a portion of the stem.

3. A transmitter in accordance with claim 2 wherein the means on the housing facilitating adjustment of the ring includes a hole in the housing, notches on the periphery of the ring, whereby a tool may be inserted through the hole and engage the notches for rotating the ring.

4. A transmitter in accordance with claim 1 including a sealed dampening unit for dampening out pulsations applied to the pressure responsive member by changes in the liquid level, said unit being disposed between said member and biasing chamber, a portion of said unit being connected to said stem.

5. A transmitter in accordance with claim 1 wherein said housing includes a base, an annular adapter coaxial with said base, said pressure responsive member having its outer periphery portion clamped between a portion of said base and adapter, and said adapter having means thereon for coupling the same to a vessel surrounding an opening in the vessel.

6. A transmitter in accordance with claim 1 wherein said housing is provided with an opening to facilitate adjustment of said loading means, and spring means in said biasing chamber on opposite sides of said loading means for applying a biasing force to said stem.

7. A transmitter in accordance with claim 1 including an anvil connected to said member, said member being a diaphragm, and said stem being connected to the anvil.

8. A transmitter in accordance with claim 1 including a valve in said housing controlling flow through a passage in said housing, said valve being coupled to said stem for actuation thereby.

9. A transmitter in accordance with claim 1 including two springs coaxial with the stem, said springs being on opposite sides of the ring, said ring having threads on a peripheral surface and mounted in said chamber for rotation about an axis substantially coaxial with said stem, and said ring being accessible from outside said chamber for adjustment of the load on said stem.

References Cited

UNITED STATES PATENTS

| | | | | |
|---|---|---|---|---|
| 2,400,048 | 5/1946 | Jones | | 251—54 X |
| 2,579,334 | 12/1951 | Plank | | 251—54 |
| 2,601,511 | 6/1952 | Gaffney | | 92—9 X |
| 2,718,232 | 9/1955 | Cook et al. | | 137—85 |
| 2,804,877 | 9/1957 | Rosenberger | | 137—85 X |
| 3,021,858 | 2/1962 | Kirk | | 137—85 |

WILLIAM F. O'DEA, *Primary Examiner.*

D. R. MATTHEWS, *Assistant Examiner.*

U.S. Cl. X.R.

73—299; 92—9; 137—85; 251—54